United States Patent
Jain et al.

(10) Patent No.: US 12,074,935 B2
(45) Date of Patent: Aug. 27, 2024

(54) SYSTEMS, METHOD, AND MEDIA FOR REMOVING OBJECTIONABLE AND/OR INAPPROPRIATE CONTENT FROM MEDIA

(71) Applicant: Google LLC, Mountain View, CA (US)

(72) Inventors: Neha Jain, Bengaluru (IN); Sandeep Khunteta, Bengaluru (IN)

(73) Assignee: GOOGLE LLC, Mountain View, CA (US)

( * ) Notice: Subject to any disclaimer, the term of this patent is extended or adjusted under 35 U.S.C. 154(b) by 335 days.

(21) Appl. No.: 17/566,057

(22) Filed: Dec. 30, 2021

(65) Prior Publication Data

US 2023/0216909 A1   Jul. 6, 2023

(51) Int. Cl.
| | | |
|---|---|---|
| H04L 65/75 | (2022.01) | |
| G10L 15/26 | (2006.01) | |
| H04N 21/234 | (2011.01) | |
| H04N 21/266 | (2011.01) | |

(52) U.S. Cl.
CPC ............. H04L 65/75 (2022.05); G10L 15/26 (2013.01); H04N 21/23418 (2013.01); H04N 21/26603 (2013.01)

(58) Field of Classification Search
CPC ... H04L 65/75; G10L 15/26; H04N 21/23418; H04N 21/26603
See application file for complete search history.

(56) References Cited

U.S. PATENT DOCUMENTS

| | | | | |
|---|---|---|---|---|
| 10,372,799 B2* | 8/2019 | Roks | .................... | G06F 40/30 |
| 10,643,074 B1* | 5/2020 | McAninly | .............. | G06N 20/10 |
| 11,533,539 B2* | 12/2022 | Gattis | ................ | H04N 21/4884 |
| 2004/0194036 A1* | 9/2004 | Wolska | ................ | G06F 40/253 |
| | | | | 715/256 |
| 2009/0094187 A1* | 4/2009 | Miyaki | ............... | G06F 21/6218 |
| 2011/0191105 A1* | 8/2011 | Spears | .................... | G06F 40/10 |
| | | | | 704/251 |
| 2012/0311625 A1* | 12/2012 | Nandi | ................ | H04N 21/4532 |
| | | | | 725/28 |
| 2014/0129225 A1* | 5/2014 | Nair | ...................... | H04L 51/063 |
| | | | | 704/E15.04 |
| 2014/0237501 A1* | 8/2014 | Berrier | ............... | H04N 21/4542 |
| | | | | 725/25 |

(Continued)

FOREIGN PATENT DOCUMENTS

WO    WO 2017124116    7/2017

*Primary Examiner* — Brian L Albertalli

(74) *Attorney, Agent, or Firm* — Brake Hughes Bellermann LLP

(57) ABSTRACT

Mechanisms for removing objectionable and/or inappropriate content from media content items are provided. In some embodiments, the method comprises: receiving a first media content item and a dictionary, wherein the first media content item includes an audio component and a video component; identifying a plurality of scenes and a plurality of scene breaks associated with the first media content item; transcribing the audio component of the first media content item to produce transcribed audio; comparing the transcribed audio to entries in the dictionary and storing matches between the transcribed audio and the entries; and generating a second media content item by removing at least a portion of at least one of the audio component and the video component based on the matches.

18 Claims, 4 Drawing Sheets

(56) References Cited

U.S. PATENT DOCUMENTS

| | | | |
|---|---|---|---|
| 2015/0070516 A1* | 3/2015 | Shoemake | H04N 21/4542 |
| | | | 348/207.11 |
| 2016/0037217 A1 | 2/2016 | Harmon et al. | |
| 2016/0050446 A1 | 4/2016 | Fujioka et al. | |
| 2017/0161796 A1* | 6/2017 | Clark | G06Q 30/0282 |
| 2017/0295215 A1* | 10/2017 | Syed | G06F 16/435 |
| 2019/0230387 A1 | 7/2019 | Gersten | |
| 2020/0092607 A1* | 3/2020 | Rechner | G06F 40/242 |
| 2020/0120384 A1* | 4/2020 | Armaly | H04N 21/4882 |
| 2022/0394331 A1* | 12/2022 | Venugopal | H04N 21/83 |

* cited by examiner

SYSTEMS, METHOD, AND MEDIA FOR REMOVING OBJECTIONABLE AND/OR INAPPROPRIATE CONTENT FROM MEDIA

TECHNICAL FIELD

The disclosed subject matter relates to methods, systems, and media for removing objectionable and/or inappropriate content from media content items.

BACKGROUND

Users frequently stream media content items (e.g., television shows, videos, movies, music videos, etc.) from servers that host diverse content libraries. In many cases, media content items can contain brief moments of content that is objectionable and/or inappropriate for certain audiences. For example, a television show can be written for a general audience and still contain a small number of words or scenes that some viewers may find objectionable and/or that are inappropriate for certain audiences (e.g., children).

Accordingly, it is desirable to provide new mechanisms for curating media content items to remove objectionable and/or inappropriate content.

SUMMARY

In accordance with some implementations of the disclosed subject matter, methods, systems, and media for generating media content items are provided.

In accordance with some implementations of the disclosed subject matter, methods for generating media content items are provided, the methods comprising: receiving a first media content item and a dictionary, wherein the first media content item includes an audio component and a video component; identifying a plurality of scenes and a plurality of scene breaks associated with the first media content item; transcribing the audio component of the first media content item to produce transcribed audio; comparing the transcribed audio to entries in the dictionary and storing matches between the transcribed audio and the entries; and generating a second media content item by removing at least a portion of at least one of the audio component and the video component based on the matches.

In some implementations, removing at least a portion of at least one of the audio component and the video component based on the matches comprises: calculating a scene transcript ratio for a scene; comparing the scene transcript ratio to a threshold value; based on the scene transcript ratio not meeting the threshold value, removing at least a portion of the audio component corresponding to matches between the transcribed audio and the entries.

In some implementations, removing at least a portion of at least one of the audio component and the video component based on the matches comprises: calculating a scene transcript ratio for a scene; comparing the scene transcript ratio to a threshold value; based on the scene transcript ratio meeting the threshold value, removing the audio component and the video component for the scene.

In some implementations, the methods further comprise calculating a scene transcript ratio, wherein the scene transcript ratio is calculated using a count of matches between the transcript and dictionary in a scene and a count of all words within the scene.

In some implementations, entries in the dictionary comprise objectionable content.

In some implementations, entries in the dictionary comprise content considered inappropriate for a target audience.

In some implementations, generating a second media content item comprises removing at least a portion of at least one of the audio component and the video component based on the matches and inserting an audio tone at a location corresponding to removal of at least one of the audio component and the video component based on the matches.

In some implementations, systems for generating media content items are provided, the systems comprising: a memory; and a hardware processor that is coupled to the memory and that is configured to: receive a first media content item and a dictionary, wherein the first media content item includes an audio component and a video component; identify a plurality of scenes and a plurality of scene breaks associated with the first media content item; transcribe the audio component of the first media content item to produce transcribed audio; compare the transcribed audio to entries in the dictionary and storing matches between the transcribed audio and the entries; and generate a second media content item by removing at least a portion of at least one of the audio component and the video component based on the matches.

In some implementations, removing at least a portion of at least one of the audio component and the video component based on the matches comprises: calculating a scene transcript ratio for a scene; comparing the scene transcript ratio to a threshold value; based on the scene transcript ratio not meeting the threshold value, removing at least a portion of the audio component corresponding to matches between the transcribed audio and the entries.

In some implementations, removing at least a portion of at least one of the audio component and the video component based on the matches comprises: calculating a scene transcript ratio for a scene; comparing the scene transcript ratio to a threshold value; based on the scene transcript ratio meeting the threshold value, removing the audio component and the video component for the scene.

In some implementations, the hardware processor is further configured to calculate a scene transcript ratio, wherein the scene transcript ratio is calculated using a count of matches between the transcript and dictionary in a scene and a count of all words within the scene.

In some implementations, entries in the dictionary comprise objectionable content.

In some implementations, entries in the dictionary comprise content considered inappropriate for a target audience.

In some implementations, generating a second media content item comprises removing at least a portion of at least one of the audio component and the video component based on the matches and inserting an audio tone at a location corresponding to removal of at least one of the audio component and the video component based on the matches.

In accordance with some implementations of the disclosed subject matter, non-transitory computer-readable media containing computer executable instructions that, when executed by a processor, cause the processor to execute a method for generating media content items are provided, the method comprising: receiving a first media content item and a dictionary, wherein the first media content item includes an audio component and a video component; identifying a plurality of scenes and a plurality of scene breaks associated with the first media content item; transcribing the audio component of the first media content item to produce transcribed audio; comparing the transcribed audio to entries in the dictionary and storing matches between the transcribed audio and the entries; and generating a second media content item by removing at least a portion of at least one of the audio component and the video component based on the matches.

In some implementations, removing at least a portion of at least one of the audio component and the video component based on the matches comprises: calculating a scene transcript ratio for a scene; comparing the scene transcript ratio to a threshold value; based on the scene transcript ratio not meeting the threshold value, removing at least a portion of the audio component corresponding to matches between the transcribed audio and the entries.

In some implementations, removing at least a portion of at least one of the audio component and the video component based on the matches comprises: calculating a scene transcript ratio for a scene; comparing the scene transcript ratio to a threshold value; based on the scene transcript ratio meeting the threshold value, removing the audio component and the video component for the scene.

In some implementations, the method further comprises calculating a scene transcript ratio, wherein the scene transcript ratio is calculated using a count of matches between the transcript and dictionary in a scene and a count of all words within the scene.

In some implementations, entries in the dictionary comprise objectionable content.

In some implementations, entries in the dictionary comprise content considered inappropriate for a target audience.

In some implementations, generating a second media content item comprises removing at least a portion of at least one of the audio component and the video component based on the matches and inserting an audio tone at a location corresponding to removal of at least one of the audio component and the video component based on the matches.

In accordance with some implementations of the disclosed subject matter, systems for generating media content items are provided, the systems comprising: means for receiving a first media content item and a dictionary, wherein the first media content item includes an audio component and a video component; means for identifying a plurality of scenes and a plurality of scene breaks associated with the first media content item; means for transcribing the audio component of the first media content item to produce transcribed audio; means for comparing the transcribed audio to entries in the dictionary and means for storing matches between the transcribed audio and the entries; and means for generating a second media content item by removing at least a portion of at least one of the audio component and the video component based on the matches.

In some implementations, means for removing at least a portion of at least one of the audio component and the video component based on the matches comprises: calculating a scene transcript ratio for a scene; comparing the scene transcript ratio to a threshold value; based on the scene transcript ratio not meeting the threshold value, removing at least a portion of the audio component corresponding to matches between the transcribed audio and the entries.

In some implementations, means for removing at least a portion of at least one of the audio component and the video component based on the matches comprises: calculating a scene transcript ratio for a scene; comparing the scene transcript ratio to a threshold value; based on the scene transcript ratio meeting the threshold value, removing the audio component and the video component for the scene.

In some implementations, the system further comprises means for calculating a scene transcript ratio, wherein the scene transcript ratio is calculated using a count of matches between the transcript and dictionary in a scene and a count of all words within the scene.

In some implementations, entries in the dictionary comprise objectionable content.

In some implementations, entries in the dictionary comprise content considered inappropriate for a target audience.

In some implementations, means for generating a second media content item comprises removing at least a portion of at least one of the audio component and the video component based on the matches and inserting an audio tone at a location corresponding to removal of at least one of the audio component and the video component based on the matches.

DETAILED DESCRIPTION

In accordance with some implementations, mechanisms (which can include systems, methods, and media) for generating curated versions of media content items are provided.

These mechanisms can be used in a variety of applications. For example, these mechanisms can be used by a user to view a media content item and to flag any scenes or portions of the content as containing objectionable and/or inappropriate material. Any suitable material (collectively referred to herein as "objectionable") can be deemed to be objectionable and/or inappropriate in some implementations. For example, objectionable material can relate to swear words and/or racial slurs.

In another example, these mechanisms can automatically generate a curated media content item, that is, a media content item where any objectionable material has been removed. In some implementations, these mechanisms can process the audio from a media content item into a transcript and can compare the transcript to a provided dictionary of bad words and/or phrases. Continuing this example, in some implementations, these mechanisms can delete the audio where the transcript matches any entry in the provided dictionary.

In some implementations, these mechanisms can calculate a scene transcript ratio. For example, in some implementations, these mechanisms can calculate the total number of transcript entries in a scene and can also calculate the number of transcript entries matching the provided dictionary entries. In some implementations, these mechanisms can determine that a scene transcript ratio is above a threshold and can curate the media content item by removing the entire scene corresponding to the scene transcript ratio over the threshold.

In another example, these mechanisms can be used to view a curated media content item. Continuing this example, a user can perform any suitable editing additional to the automatic curation of the media content item. As such, in some implementations, these mechanisms can combine automated curation and manual curation to provide a media content item that is free of objectionable material.

Figure 1:
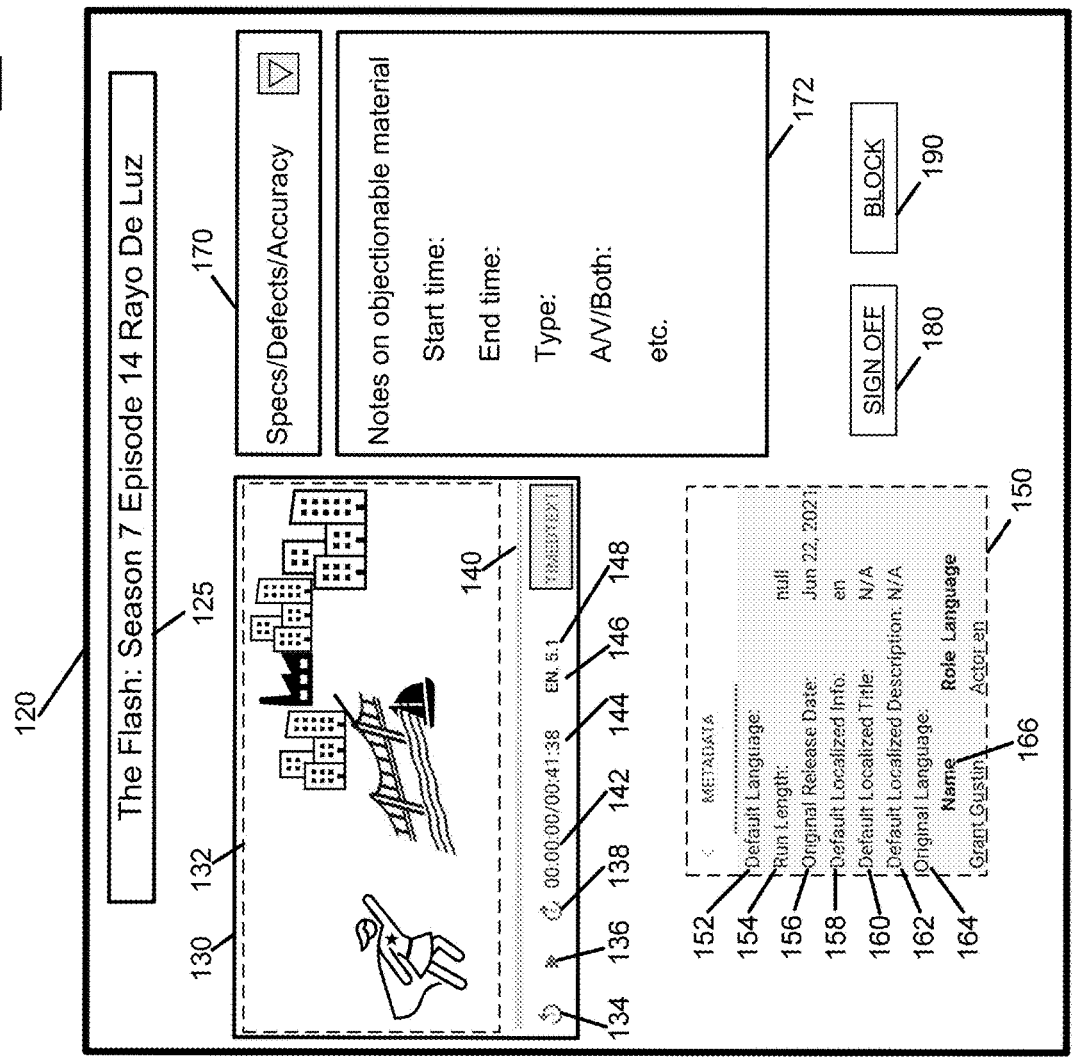
FIG. 1 shows an example of a user interface for reviewing media content items in accordance with some implementations of the disclosed subject matter.
Figure 1:
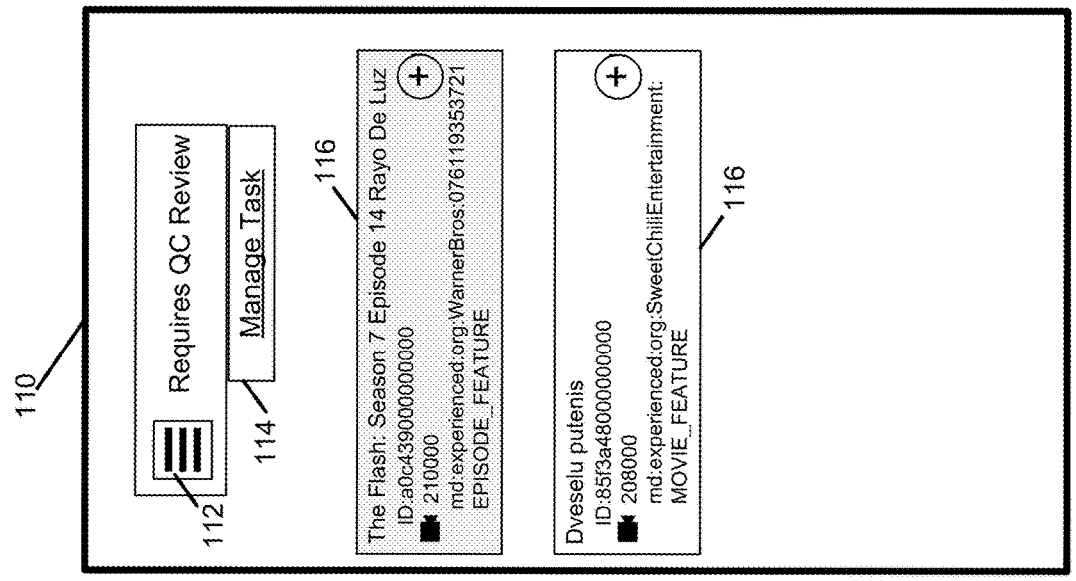

Turning to FIG. 1, a graphical user interface (GUI) 100 for reviewing media content items in accordance with some implementations of the disclosed subject matter is shown. In some implementations, GUI 100 can be presented on a display of a user device 306 described below in connection with FIG. 3.

As illustrated, GUI 100 can include a navigation pane 110 and a task pane 120. In some implementations, GUI 100 can include any other suitable elements.

In some implementations, navigation pane 110 can contain a navigation menu 112, a button 114, one or more content tile(s) 116, and/or any other suitable elements. In some implementations, navigation menu 112 can have a hidden state in which navigation menu 112 does not appear within GUI 100 and an expanded state in which navigation elements within navigation menu 112 are visible and/or clickable by a user of user device 306. In some implementations, navigation menu 112 can contain navigation elements for providing sorting (e.g., by language, TV show(s), movie(s), etc.), filtering (e.g., by language, TV episode(s), movie(s), etc.) and/or any other suitable navigation feature. In some implementations, button 114 can activate a menu for managing tasks in navigation pane 110.

In some implementations, content tile 116 can be a clickable element which can load a media content item into task pane 120. In some implementations, content tile 116 can include media content item information, such as a title, a content ID number, a metadata tag indicating any suitable metadata (e.g., publishing source, type of content, etc.), and/or any other suitable information. In some implementations, content tile 116 can include a priority indicator such as a view metric, popularity metric, and/or any other priority indicator.

In some implementations, task pane 120 can contain a content title display 125, video player 130, a metadata box 150, a dropdown menu 170, a note taking panel 172, one or more action buttons such as "Sign Off" 180 and "Block" 190, and/or any other suitable elements.

In some implementations, content title display 125 can contain a title of the media content item displayed in task pane 120. For example, content title display 125 can be a movie title, TV show title, TV episode title and/or number, and/or any other suitable reference to the media content item.

In some implementations, video player 130 can be configured to play media content items. In some implementations, video player 130 can include a video display area 132. In some implementations, video player 130 can include video navigation elements such as buttons representing back (e.g., 5 seconds) 134, play 136, pause (not shown), forward (e.g., 5 seconds) 138, increment forward/backwards per-frame (not shown), and/or any other suitable video navigation element(s). In some implementations, video player 130 can include display elements such as a video progress bar 140, current timestamp 142, total runtime indicator 144 for the media content item which is currently loaded in video player 130, playback language indicator 146, audio support indicator 148 (e.g., 5.1 surround sound) and/or any other suitable items relating to a video presentation. In some implementations, video player 130 can include a closed captioning display (not shown) in any suitable language, such as a language chosen by the user.

In some implementations, video player 130 can play a media content item loaded into task pane 120 from navigation menu 110. In some implementations, video player 130 can play a curated media content item as described in connection with process 200 of FIG. 2 below. In some implementations, video player 130 can play any suitable output from process 200. For example, in some implementations, a user can review media content output from process 200 for quality control, additional editing, and/or any other suitable purpose. In some implementations, video player 130 and/or any other suitable area of GUI 100 can include any suitable video editing tools (not shown) such as frame removal, scene removal, pixelization, and/or any other suitable tool(s).

In some implementations, metadata box 150 can display any metadata associated with the content clip. For example, metadata box 150 can display a default language 152, a runtime 154, a release date 156, location information 158, a local title 160, a local description 162, an original language 164, and/or any other suitable metadata. In another example, metadata box 150 can display credits 166 associated with creation of the content clip, including names, roles, and languages of actor(s), actress(es), director(s), editor(s), camera operator(s), etc.

In some implementations, dropdown menu 170 can contain additional tools.

In some implementations, panel 172 can contain input fields for noting objectionable material within the media content item. For example, in some implementations, panel 172 can contain a field for entering a start time and/or an end time of objectionable material. Note that an indication of a start and/or an end time can be based on the current timestamp displayed in video player 130. In another example, in some implementations, panel 172 can contain a field for entering a type of objectionable material (foul language, violence, nudity, gore, etc.). In another example, in some implementations, panel 172 can contain a field for indicating where the objectionable material appears within the media content item (i.e., in the audio track and/or in the visual track). In some implementations, one or more fields within panel 172 can be text-based boxes, drop-down menus, radio button selections, and/or any other suitable element to collect user input.

In some implementations, panel 172 can display any content generated at 218 of process 200, as described in connection with FIG. 2 below. For example, as noted above, video player 130 can play a curated media content item output from process 200. Continuing this example, panel 172 can display any suitable information regarding the edits made to the media content item by process 200 which result in the curated media content item.

In some implementations, "Sign Off" button 180 can be used to approve the content shown in the video playback area. In some implementations, button 180 can associate any suitable input from panel 172 with the media content item.

In some implementations, "Block" button 190 can create an indication for the content shown in the video playback area. In some implementations, the indication can be any suitable text, identifier, and/or label. For example, in some implementations, if button 190 is pressed in connection with viewing a TV episode such as the one shown in the video playback area in FIG. 1, an indication can be created that restricts the TV episode to viewing by certain viewer profiles (such as those available in a streaming service). In some implementations, button 190 can additionally associate any suitable content from panel 172 with the media content item.

Figure 2:
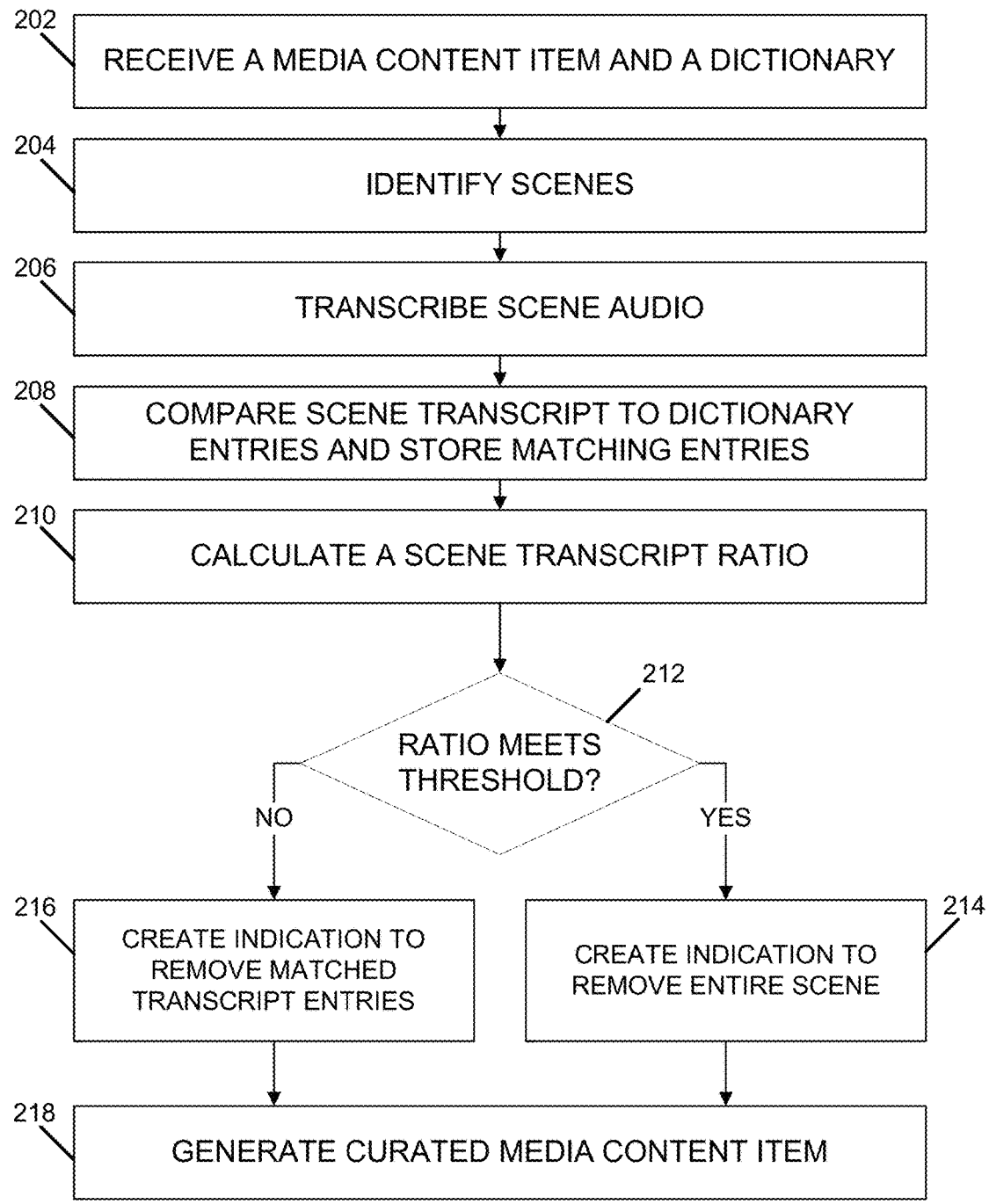
FIG. 2 shows an example of a process for generating a curated media content item in accordance with some implementations of the disclosed subject matter.

Turning to FIG. 2, an example process 200 for generating a curated media content item in accordance with some implementations is shown. In some implementations, process 200 can be performed by server 302 described below in connection with FIG. 3.

In some implementations, process 200 can begin, for example, when a user loads GUI 100 using a user device(s) 308 or 310. In another example, process 200 can begin when a user loads a media content item from navigation menu 110 into task pane 120 of GUI 100. In some implementations, process 200 can begin when GUI 100 is opened but a user has not loaded a media content item into navigation pane 110 and/or task pane 120. In some implementations, process 200 can begin at any suitable time and/or based upon any suitable conditions.

After process 200 begins, a media content item and a dictionary can be received at 202. In some implementations, the media content item can be received from any source and can be received in any manner. In some implementations, the media content item can be an episode of a television show, a movie, a music video, and/or any other suitable media file containing an audio component and/or a video component. In some implementations, the media content item can be any suitable audio/visual file type and can be any suitable length. In some implementations, the audio component can contain one or more spoken languages.

In some implementations, the dictionary can be a text file, and/or any other suitable file type. In some implementations, the dictionary can contain any suitable number of entries. Note that, in some implementations, the dictionary entries can be spread across multiple files. In some implementations, the dictionary entries can be in one or more suitable languages. For example, in some implementations, the dictionary entries can be in the same language(s) as the audio component of the media content item.

In some implementations, the dictionary can contain words and/or phrases which are considered objectionable. For example, in some implementations, the dictionary can contain swear words, expletives, racial slurs, terms relating to tobacco, alcohol, firearms, gambling, and/or any other objectionable content. In some implementations, the dictionary can contain indications of any other types of audio such as sounds, for example, of partners in intimate situations.

Next, at 204, process 200 can identify scenes in the media content item in some implementations. In some implementations, process 200 can identify scenes 204 in any suitable manner. For example, scenes can be identified at 204 in some implementations through metadata included in the media content item. In another example, in some implementations, process 200 can analyze closed captions provided with the media content to determine scenes at 204. Note that process 200 can use any suitable analysis technique(s) to determine scenes at 204.

Additionally, process 200 can store the identified scenes in any suitable manner at 204. For example, a list of start times and end times for each scene can be stored in memory and/or storage. In another example, scenes can be stored by a starting frame number and an end frame number, and/or a starting frame number and a duration of frames from the starting frame. In some implementations, any other suitable information such as metadata can be included when storing the identified scenes at 204. For example, in some implementations, a scene title, scene language, scene actors, and/or any other suitable scene metadata can be included when storing a scene start time and a scene end time.

Next, at 206, process 200 can transcribe the audio component of the media content item in some implementations.

In some implementations, process 200 can transcribe the audio component in any suitable manner at 206. For example, process 200 can, in some implementations, use any suitable speech-to-text tool at 206. In some implementations, process 200 can analyze the audio component at 206 for each scene separately, resulting in a separate scene transcript for each scene. In some implementations, at 206, process 200 can identify a transcript previously generated (e.g., closed captioning) and associated with the media content item received at 202. In some implementations, process 200 can add the scene break identifications to a previously identified transcript, resulting in scene transcript(s)s at 206. In some implementations, process 200 can transcribe the audio component based on a language identified in the metadata of the media content item, or a language identified in any other suitable manner. In some implementations, the transcript can include any scene data, such as timestamps, frame numbers, scene titles, and/or any other suitable information.

Then, at 208, process 200 can, in some implementations, compare the scene transcript(s) to the dictionary entries received at 202 in any suitable manner. For example, in some implementations, process 200 can use regular expressions to search for dictionary entries at 208 within the scene transcript(s). In some implementations, process 200 can use character matching of any suitable length at 208. In some implementations, process 200 can perform any suitable filtering of search results at 208, such as screening for context in which any dictionary entry appears in a portion of the scene transcript(s). In some implementations, process 200 can store an indication at 208 of a match in any suitable manner, such as including the transcribed text along with a timestamp, frame number, scene title, and/or any other suitable information. Note that, in some implementations, portions of transcribed text which occur before and/or after a dictionary match can be stored in addition to the portion of the transcribed text which matches a dictionary entry.

Next, at 210, process 200 can calculate a scene transcript ratio in some implementations. Process 200 can calculate the scene transcript ratio in any suitable manner at 210 in some implementations. In some implementations, process 200 can calculate a scene transcript ratio at 210 for each scene identified at 204. For example, if process 200 identifies at 204 that a situational comedy ('sitcom') TV episode contains 12 scenes, process 200 can calculate a separate scene transcript ratio at 210 corresponding to each of the 12 scenes. In some implementations, the scene transcript ratio can be the number of dictionary matches identified at 208, divided by the total number of words in the scene (i.e., fraction of 'bad words'). In some implementations, the scene transcript ratio can be the number of words from the scene transcript which did not have a dictionary match at 208, divided by the total number of words in the scene (i.e., fraction of 'good words'). In another example, in some implementations, any suitable filter can be applied to the scene transcript before counting the total number of words in a scene. In a particular example, in some implementations, at 210, process 200 can filter out conjunctions ('and', 'or', 'but', etc.), articles ('the', 'a', 'an', etc.), and/or any other suitable words from the scene transcript before counting the total number of words in a scene.

Then, at 212, process 200 can compare the scene transcript ratio to a threshold value in some implementations. In some implementations, the threshold can be any suitable value. For example, in some implementations, the threshold can be a real value between 0 and 1. In some implementations, process 200 can perform the comparison at 212 in any suitable manner. In some implementations, if the comparison signifies the scene transcript ratio to be at or above the threshold, process 200 can continue to 214. In some implementations, if the comparison signifies the scene transcript ratio below the threshold, process 200 can continue to 216.

At 214, process 200 can, in some implementations, create an indication to remove the entire scene associated with the scene transcript ratio that was found to be above the threshold value at 212. In some implementations, process 200 can use the scene title, start time and end time, starting frame and ending frame, and/or any other suitable information at 214 to indicate the scene for removal.

At 216, process 200 can, in some implementations, create an indication to remove the audio component(s) corresponding to any dictionary matches found in the scene transcript at 208. In some implementations, process 200 can use the scene title, a time stamp, a frame number, and/or any other suitable information at 216 to indicate the position of the audio to be removed.

At 218, process 200 can create a curated version of the media content item in some implementations. For example, process 200 can edit the media content item according to the indications generated at 214 and/or 216 in some implementations. In some implementations, scenes indicated for removal at 214 can be removed according to the scene title, start time and end time, starting frame and ending frame, and/or any other suitable scene break information identified at 204. In some implementations, process 200 can, at 218, remove one or both of the audio component and the video component of the media content item. In some implementations, process 200 can, at 218, identify a single word, a series of words, a start time and an end time, and/or any other suitable portion of the audio component corresponding to the transcript used in 208 and matched to a dictionary entry. In some implementations, process 200 can, at 218, remove portion(s) of the audio component without removing or altering the video component within a scene identified at 216. For example, in some implementations, process 200 can remove the portion(s) of audio corresponding to words and/or phrases identified through the scene transcript comparison at 208.

In some implementations, at 218, process 200 can insert an audio tone and/or any other suitable audio and/or visual. For example, in some implementations, at 218, process 200 can insert a noise at the same location as any removed portion of the audio component (e.g., insert a bleep to replace a swear word). In another example, at 218, process 200 can insert any number of suitable frames containing any suitable audio, text, images, and/or other graphic indicating that a scene had been removed in some implementations.

In some implementations, at 218, process 200 can cause metadata in the curated media content item to include a list of edits made to the media content item received at 202, and/or to include any other suitable information. In some implementations, process 200 can end when the plurality of indications created at 214 and 216 are processed into a curated media content item. In some implementations, at 218, process 200 can allow a user of GUI 100 to review, adjust, and/or approve the edits made at 214 and/or 216. For example, in some implementations, at 218, process 200 can allow a user of GUI 100 to make additional edits to the curated media content item. In a particular example, in some implementations, at 218, a user can review the curated media content item and can remove additional scenes containing nudity and/or imagery that does not have a corresponding audio component appearing in the scene transcript, thus was not considered by process 200 at 208 when comparing the scene transcript against the dictionary.

It should be understood that at least some of the above-described blocks of the process of FIG. 2 can be executed or performed in any order or sequence not limited to the order and sequence shown in and described in connection with the figure. Also, some of the above blocks of the process of FIG. 2 can be executed or performed substantially simultaneously where appropriate or in parallel to reduce latency and processing times. Additionally or alternatively, some of the above described blocks of the process of FIG. 2 can be omitted.

Figure 3:
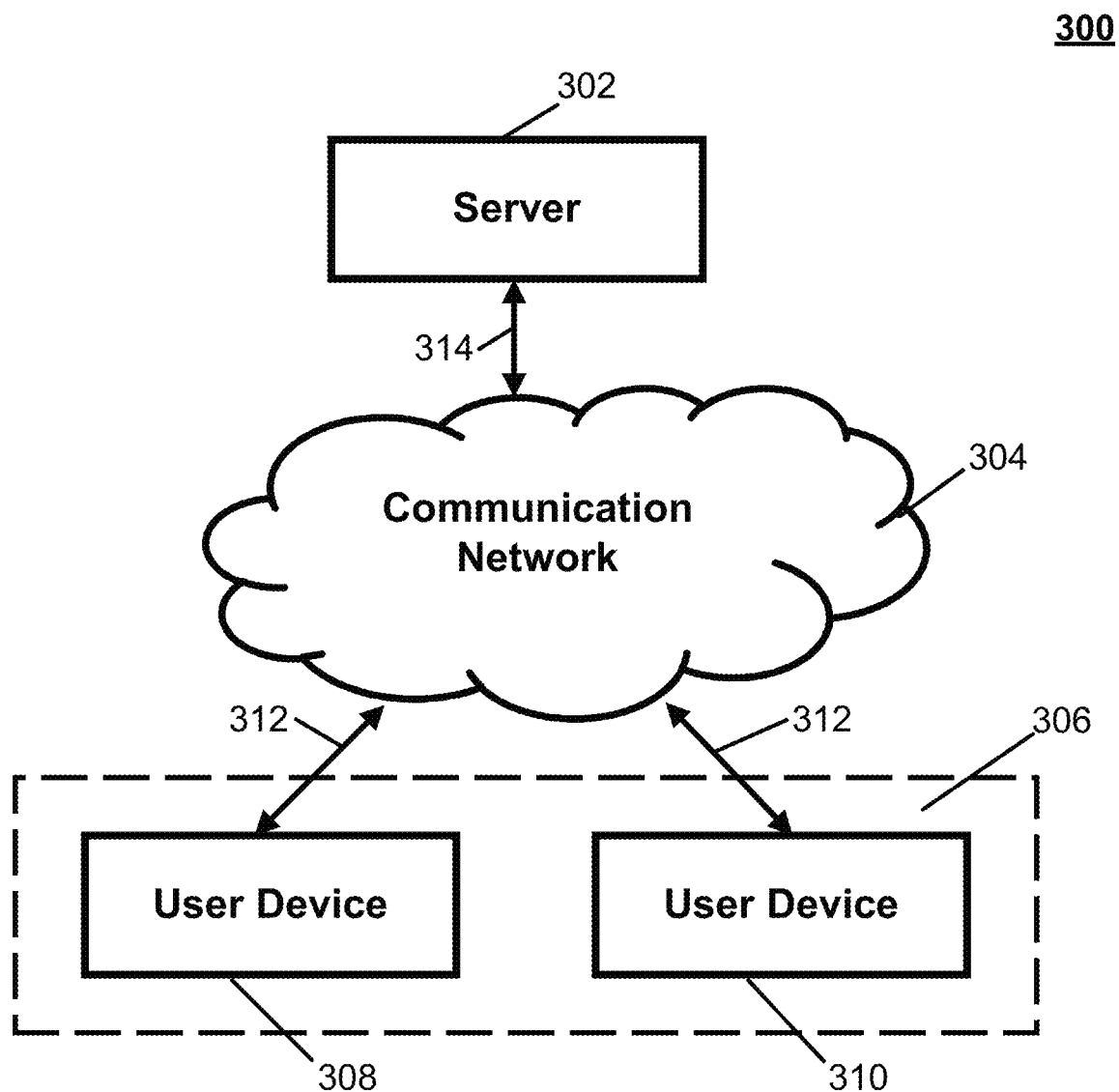
FIG. 3 shows an example of a schematic diagram of a system that could be used to implement mechanisms described herein in accordance with some implementations of the disclosed subject matter.

Turning to FIG. 3, an example 300 of hardware for generating curated media content items in accordance with some implementations is shown. As illustrated, hardware 300 can include a server 302, a communication network 304, and/or one or more user devices 306, such as user devices 308 and 310.

Server 302 can be any suitable server(s) for storing information, data, programs, media content, and/or any other suitable content. In some implementations, server 302 can perform any suitable function(s).

Communication network 304 can be any suitable combination of one or more wired and/or wireless networks in some implementations. For example, communication network can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 306 can be connected by one or more communications links (e.g., communications links 312) to communication network 304 that can be linked via one or more communications links (e.g., communications links 314) to server 302. The communications links can be any communications links suitable for communicating data among user devices 306 and server 302 such as network links, dial-up links, wireless links, hard-wired links, any other suitable communications links, or any suitable combination of such links.

User devices 306 can include any one or more user devices suitable for use with GUI 100. In some implementations, user device 306 can include any suitable type of user device, such as mobile phones, tablet computers, wearable computers, laptop computers, desktop computers, smart televisions, media players, game consoles, vehicle information and/or entertainment systems, and/or any other suitable type of user device.

Although server 302 is illustrated as one device, the functions performed by server 302 can be performed using any suitable number of devices in some implementations. For example, in some implementations, multiple devices can be used to implement the functions performed by server 302.

Although two user devices 308 and 310 are shown in FIG. 3 to avoid overcomplicating the figure, any suitable number of user devices, (including only one user device) and/or any suitable types of user devices, can be used in some implementations.

Figure 4:
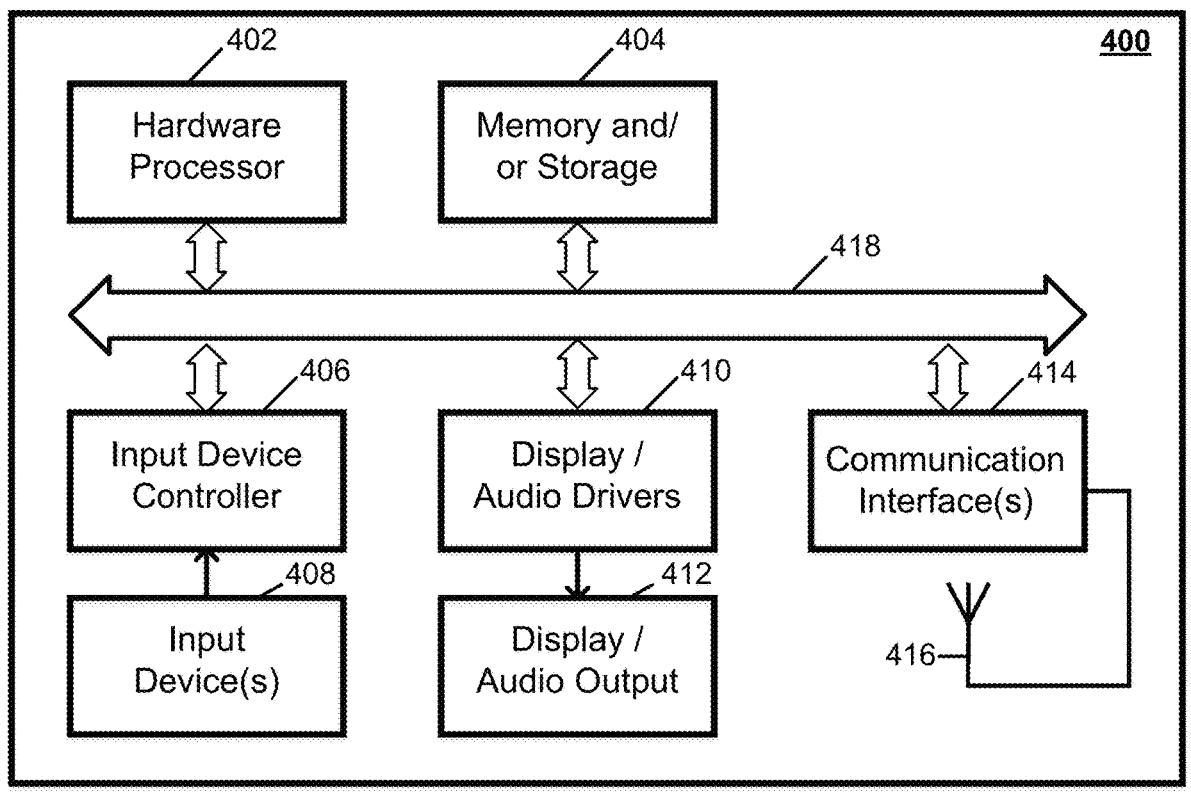
FIG. 4 shows an example of hardware that can be used in a server and/or a user device of FIG. 3 in accordance with some implementations of the disclosed subject matter.

Server 302 and user devices 306 can be implemented using any suitable hardware in some implementations. For example, in some implementations, devices 302 and 306 can be implemented using any suitable general-purpose computer or special-purpose computer and can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general-purpose computer or a special-purpose computer in some implementations. In some implementations, hardware processor 402 can be controlled by a computer program stored in memory and/or storage 404. For example, in some implementations, the computer program can cause hardware processor 402 to perform functions described herein.

Memory and/or storage 404 can be any suitable memory and/or storage for storing programs, data, documents, and/or any other suitable information in some implementations. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some implementations. For example, input device controller 406 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 410 can be any suitable circuitry for controlling and driving output to one or more display/audio output devices 412 in some implementations. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks, such as network 304 as shown in FIG. 3. For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some implementations. In some implementations, antenna 416 can be omitted.

Bus 418 can be any suitable mechanism for communicating between two or more components 402, 404, 406, 410, and 414 in some implementations.

Any other suitable components can be included in hardware 400 in accordance with some implementations.

In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for generating media content items, comprising:
   receiving a first media content item and a dictionary, wherein the first media content item includes an audio component and a video component;
   identifying a plurality of scenes and a plurality of scene breaks associated with the first media content item;
   transcribing the audio component of the first media content item to produce transcribed audio;
   comparing the transcribed audio to entries in the dictionary and storing matches between the transcribed audio and the entries;
   calculating a scene transcript ratio, wherein the scene transcript ratio is calculated using a count of matches between the transcribed audio and the dictionary in a scene and a count of all words within the scene; and
   generating a second media content item by removing at least a portion of at least one of the audio component and the video component based on the matches using the scene transcript ratio.

2. The method of claim 1, wherein removing at least a portion of at least one of the audio component and the video component based on the matches comprises:
   comparing the scene transcript ratio to a threshold value; and
   based on the scene transcript ratio not meeting the threshold value, removing at least a portion of the audio component corresponding to matches between the transcribed audio and the entries.

3. The method of claim 1, wherein removing at least a portion of at least one of the audio component and the video component based on the matches comprises:
   comparing the scene transcript ratio to a threshold value; and
   based on the scene transcript ratio meeting the threshold value, removing the audio component and the video component for the scene.

4. The method of claim 1, wherein entries in the dictionary comprise objectionable content.

5. The method of claim 1, wherein entries in the dictionary comprise content considered inappropriate for a target audience.

6. The method of claim 1, wherein generating a second media content item comprises removing at least a portion of at least one of the audio component and the video component based on the matches and inserting an audio tone at a location corresponding to removal of at least one of the audio component and the video component based on the matches.

7. A system for generating media content items, the system comprising:
   a memory; and
   a hardware processor that is coupled to the memory and that is configured to:

receive a first media content item and a dictionary, wherein the first media content item includes an audio component and a video component;

identify a plurality of scenes and a plurality of scene breaks associated with the first media content item;

transcribe the audio component of the first media content item to produce transcribed audio;

compare the transcribed audio to entries in the dictionary and storing matches between the transcribed audio and the entries;

calculate a scene transcript ratio, wherein the scene transcript ratio is calculated using a count of matches between the transcribed audio and the dictionary in a scene and a count of all words within the scene; and generate a second media content item by removing at least a portion of at least one of the audio component and the video component based on the matches using the scene transcript ratio.

8. The system of claim 7, wherein removing at least a portion of at least one of the audio component and the video component based on the matches comprises:

comparing the scene transcript ratio to a threshold value; and based on the scene transcript ratio not meeting the threshold value, removing at least a portion of the audio component corresponding to matches between the transcribed audio and the entries.

9. The system of claim 7, wherein removing at least a portion of at least one of the audio component and the video component based on the matches comprises:

comparing the scene transcript ratio to a threshold value; and based on the scene transcript ratio meeting the threshold value, removing the audio component and the video component for the scene.

10. The system of claim 7, wherein entries in the dictionary comprise objectionable content.

11. The system of claim 7, wherein entries in the dictionary comprise content considered inappropriate for a target audience.

12. The system of claim 7, wherein generating a second media content item comprises removing at least a portion of at least one of the audio component and the video component based on the matches and inserting an audio tone at a location corresponding to removal of at least one of the audio component and the video component based on the matches.

13. A non-transitory computer-readable medium containing computer executable instructions that, when executed by a processor, cause the processor to execute a method for generating media content items, the method comprising:

receiving a first media content item and a dictionary, wherein the first media content item includes an audio component and a video component;

identifying a plurality of scenes and a plurality of scene breaks associated with the first media content item;

transcribing the audio component of the first media content item to produce transcribed audio;

comparing the transcribed audio to entries in the dictionary and storing matches between the transcribed audio and the entries;

calculating a scene transcript ratio, wherein the scene transcript ratio is calculated using a count of matches between the transcribed audio and the dictionary in a scene and a count of all words within the scene; and generating a second media content item by removing at least a portion of at least one of the audio component and the video component based on the matches using the scene transcript ratio.

14. The non-transitory computer-readable medium of claim 13, wherein removing at least a portion of at least one of the audio component and the video component based on the matches comprises:

comparing the scene transcript ratio to a threshold value; and based on the scene transcript ratio not meeting the threshold value, removing at least a portion of the audio component corresponding to matches between the transcribed audio and the entries.

15. The non-transitory computer-readable medium of claim 13, wherein removing at least a portion of at least one of the audio component and the video component based on the matches comprises:

comparing the scene transcript ratio to a threshold value; and based on the scene transcript ratio meeting the threshold value, removing the audio component and the video component for the scene.

16. The non-transitory computer-readable medium of claim 13, wherein entries in the dictionary comprise objectionable content.

17. The non-transitory computer-readable medium of claim 13, wherein entries in the dictionary comprise content considered inappropriate for a target audience.

18. The non-transitory computer-readable medium of claim 13, wherein generating a second media content item comprises removing at least a portion of at least one of the audio component and the video component based on the matches and inserting an audio tone at a location corresponding to removal of at least one of the audio component and the video component based on the matches.

* * * * *